(12) United States Patent
Hazra et al.

(10) Patent No.: US 10,832,353 B2
(45) Date of Patent: Nov. 10, 2020

(54) DETERMINING INTERMITTENT RENEWABLE ENERGY PENETRATION LIMITS IN A GRID

(71) Applicants: International Business Machines Corporation, Armonk, NY (US); Universiti Brunei Darussalam, Gadong (BN)

(72) Inventors: Jagabondhu Hazra, Bangalore (IN); Manikandan Padmanaban, Bangalore (IN); Ashish Verma, Bangalore (IN); Mohammad Iskandar Pg Hj Petra, Jalan Gadong (BN); Sathyajith Mathew, Jalan Gadong (BN)

(73) Assignees: International Business Machines Corporation, Armonk, NY (US); Universiti Brunei Darussalam, Tungku Link (BN)

( * ) Notice: Subject to any disclaimer, the term of this patent is extended or adjusted under 35 U.S.C. 154(b) by 1197 days.

(21) Appl. No.: 14/926,829

(22) Filed: Oct. 29, 2015

(65) Prior Publication Data
US 2017/0124666 A1  May 4, 2017

(51) Int. Cl.
*G06Q 50/06* (2012.01)
*G06Q 10/06* (2012.01)

(52) U.S. Cl.
CPC ....... *G06Q 50/06* (2013.01); *G06Q 10/06315* (2013.01)

(58) Field of Classification Search
CPC .......................... G06Q 50/06; G06Q 10/06315
(Continued)

(56) References Cited

U.S. PATENT DOCUMENTS 8,738,191 B2   5/2014   Aivaliotis et al.
8,996,187 B2   3/2015   Sharma et al.
(Continued)

OTHER PUBLICATIONS

S. Dutta and R. Sharma, "Optimal storage sizing for integrating wind and load forecast uncertainties," 2012 IEEE PES Innovative Smart Grid Technologies (ISGT), Washington, DC, 2012, pp. 1-7, DOI: 10.1109/ISGT.2012.6175721 (Year: 2012).*
(Continued)

*Primary Examiner* — Timothy Padot
*Assistant Examiner* — Darlene Garcia-Guerra
(74) *Attorney, Agent, or Firm* — Ryan, Mason & Lewis, LLP

(57) ABSTRACT

Methods, systems, and computer program products for determining intermittent renewable energy penetration limits in a grid are provided herein. A computer-implemented method includes determining a load forecast for an electrical network based on historical load data and future step load information; determining the maximum size of renewable energy sources that can be added to the network based on the load forecast, parameters pertaining to the network, information pertaining to the renewable energy sources, and information pertaining to non-renewable energy sources; determining a storage component size for storing renewable energy generated by the renewable energy sources based on the maximum size of the renewable energy sources and constraints associated with the network; determining a minimum loading level of the non-renewable energy sources based on the load forecast, intermittency data associated with the renewable energy sources and the parameters pertaining to the network; and configuring the network based on the determinations.

17 Claims, 5 Drawing Sheets

(58) Field of Classification Search
USPC .......................................... 705/7.25; 700/291
See application file for complete search history.

(56) References Cited

U.S. PATENT DOCUMENTS

| | | | | |
|---|---|---|---|---|
| 2004/0158360 | A1* | 8/2004 | Garland, II | G06Q 50/06 700/286 |
| 2008/0186646 | A1* | 8/2008 | Corum | H02J 15/00 361/225 |
| 2010/0057480 | A1* | 3/2010 | Arfin | G06Q 10/10 705/1.1 |
| 2010/0076615 | A1* | 3/2010 | Daniel | H02J 1/14 700/293 |
| 2011/0231028 | A1* | 9/2011 | Ozog | G06Q 10/06 700/291 |
| 2011/0307109 | A1* | 12/2011 | Sri-Jayantha | G06Q 50/06 700/291 |
| 2012/0083930 | A1* | 4/2012 | Ilic | G06Q 30/06 700/287 |
| 2012/0130556 | A1* | 5/2012 | Marhoefer | H02J 3/32 700/291 |
| 2012/0265586 | A1* | 10/2012 | Mammone | G06Q 30/02 705/14.1 |
| 2013/0085616 | A1* | 4/2013 | Wenzel | G05F 1/66 700/278 |
| 2013/0166084 | A1 | 6/2013 | Sedighy et al. | |
| 2013/0176000 | A1* | 7/2013 | Bishop | H02J 7/0052 320/149 |
| 2013/0190938 | A1* | 7/2013 | Zadeh | H02J 13/0013 700/291 |
| 2013/0212410 | A1* | 8/2013 | Li | G06F 1/263 713/300 |
| 2013/0218548 | A1* | 8/2013 | Lazaris | F03G 6/00 703/18 |
| 2013/0325694 | A1* | 12/2013 | Harlingten | G06Q 40/025 705/38 |
| 2014/0039710 | A1* | 2/2014 | Carter | G06Q 10/06 700/291 |
| 2014/0059510 | A1 | 2/2014 | Chen | |
| 2014/0129040 | A1* | 5/2014 | Emadi | G06Q 50/06 700/291 |
| 2014/0172503 | A1* | 6/2014 | Hammerstrom | G06Q 30/0206 705/7.31 |
| 2014/0200723 | A1* | 7/2014 | Roy | G06Q 50/06 700/291 |
| 2014/0346868 | A1* | 11/2014 | Kuznetsov | H02J 4/00 307/18 |
| 2015/0278968 | A1* | 10/2015 | Steven | G06Q 50/06 705/7.35 |
| 2015/0302332 | A1* | 10/2015 | Wang | G06Q 50/06 705/7.22 |
| 2016/0055507 | A1* | 2/2016 | Patil | G06Q 30/0206 705/7.31 |
| 2016/0099567 | A1* | 4/2016 | Sun | H02J 3/14 700/296 |
| 2016/0118878 | A1* | 4/2016 | Alteneiji | H02J 3/1821 323/205 |
| 2016/0274608 | A1* | 9/2016 | Mohammed | G06Q 30/0206 |
| 2017/0005515 | A1* | 1/2017 | Sanders | H02J 3/381 |

OTHER PUBLICATIONS

Michael Knopp, Master Thesis, Study on maximum permissible intermittent electricity generators in an electric supply network based on grid stability power quality criteria. 2012.

Li et al., A Simple Sizing Algorithm for Stand-Alone PV/Wind/Battery Hybrid Microgrids. Energies 2012.

Deng et al., Optimal sizing of distributed generations in microgrid system. Technology, 2013.

Denholm et al., Evaluating the limits of solar photovoltaics (PV) in electric power systems utilizing energy storage and other enabling technologies. Energy policy, vol. 35, Issue 9, Sep. 2007.

Denholm et al., Evaluating the limits of solar photovoltaics (PV) in traditional electric power systems. Energy Policy, vol. 35, Issue 5, May 2007.

Tayati et al., Renewable energy penetration limits for isolated remote area power system. Solar2010, the 48th AuSES Annual Conference, Dec. 2010.

* cited by examiner

DETERMINING INTERMITTENT RENEWABLE ENERGY PENETRATION LIMITS IN A GRID

FIELD

The present application generally relates to information technology, and, more particularly, to renewable energy technology.

BACKGROUND

Usage of renewable energy continues to increase throughout many regions. Renewable energy (RE) sources such as wind and solar, however, are unpredictable due to their weather dependency. With such unpredictability, the usage of renewable energy sources can introduce intermittency that affects the reliability of a grid. To maintain the reliability of the grid, grid operators often curtail renewable sources from the grid. In many scenarios, such disadvantageous curtailments occur because of a transmission bottleneck to transfer extra energy generation from renewable energy sources.

SUMMARY

In one embodiment of the present invention, techniques for determining intermittent renewable energy penetration limits in a grid are provided. An exemplary computer-implemented method can include steps of determining a load forecast for an electrical network based on (i) historical load data for the electrical network, and (ii) future step load information for the electrical network; and determining the maximum size of one or more renewable energy sources that can be added to the electrical network based on (i) the load forecast, (ii) one or more parameters pertaining to the electrical network, (iii) information pertaining to the one or more renewable energy sources, and (iv) information pertaining to one or more non-renewable energy sources Such an embodiment also includes determining a size of at least one storage component for storing renewable energy generated by at least one of the one or more renewable energy sources, wherein determining the size is based on (i) the maximum size of the one or more renewable energy sources that can be added to the electrical network, and (ii) one or more constraints associated with the electrical network; and determining a minimum loading level of the one or more non-renewable energy sources based on (i) the load forecast, (ii) intermittency data associated with the one or more renewable energy sources and (iii) the one or more parameters pertaining to the electrical network. Further, such an embodiment includes configuring the electrical network based on (i) the maximum size of the one or more renewable energy sources that can be added to the electrical network, (ii) the size of the at least one storage component for storing renewable energy, and (iii) the minimum loading level of the one or more non-renewable energy sources.

In another embodiment of the invention, an exemplary computer-implemented method can include steps of determining a load forecast for an electrical network based on (i) historical load data for the electrical network, and (ii) future step load information for the electrical network; determining an initial size of one or more renewable energy sources that can be added to the electrical network based on (i) the load forecast, (ii) one or more parameters pertaining to the electrical network, (iii) information pertaining to the one or more renewable energy sources, and (iv) information pertaining to one or more non-renewable energy sources. Such an embodiment also includes determining an amount of future increase to the size of the one or more renewable energy sources that can be added to the electrical network per a given temporal frequency based on (i) the load forecast and (ii) the initial size of the one or more renewable energy sources that can be added to the electrical network; and determining a size of at least one storage component for storing renewable energy generated by at least one of the one or more renewable energy sources, wherein determining the size is based on (i) the initial size of the one or more renewable energy sources that can be added to the electrical network, (ii) the amount of future increase to the size of the one or more renewable energy sources that can be added to the electrical network, and (iii) one or more constraints associated with the electrical network. Additionally, such an embodiment also includes determining a minimum loading level of the one or more non-renewable energy sources based on (i) the load forecast, (ii) intermittency data associated with the one or more renewable energy sources and (iii) the one or more parameters pertaining to the electrical network; and configuring the electrical network based on (i) the initial size of the one or more renewable energy sources that can be added to the electrical network, (ii) the amount of future increase to the size of the one or more renewable energy sources that can be added to the electrical network, (iii) the size of the at least one storage component for storing renewable energy, and (iv) the minimum loading level of the one or more non-renewable energy sources.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes determining intermittent renewable energy penetration limits (that is, how much renewable energy can be added) in a grid and/or a micro-grid. At least one embodiment of the invention includes utilizing historical load data, future step load information, static electrical network data and dynamic equipment (generator, protection system, etc.) data, one or more renewable resources, cost information and intermittency data to optimize a step-wise (for example, yearly) cumulative renewable integration limit and size of each of one or more renewable energy sources. As would be appreciated by one skilled in the art, load commonly increases gradually. Accordingly, any unexpected and/or sudden increase in load is referred to herein as step load. For example, step load information might result from a new smart city initiative, an introduction to electric cars, etc.

Additionally, one or more embodiments of the invention include determining the maximum renewable energy penetration limit into a grid/micro-grid given the load profile, one or more network parameters and one or more generation source characteristics. Network parameters can include transformer/transmission line resistance, reactance, capacitance, etc. Generation source characteristics can include generator parameters such as transient reactance, droop characteristics, etc. Such an embodiment as noted above can include determining the minimum loading level (for example, an instantaneous level and/or an average leverage) of conventional sources in the presence of intermittent renewable energy sources to maintain stability of the grid given the load profile, network parameters and generation source characteristics. Further, such an embodiment can also include determining the optimal sizing of the renewable energy storage based on reliability and one or more economy factors (such as capital expenditures and operating expenses for storage of renewable sources). At least one embodiment of the invention includes designing a grid and/or micro-grid wherein, based on dynamic behavior of load and generation, a size of a renewable energy source/resource to be integrated in each phase of a given renewable integration plan is determined. The determined renewable energy resource size helps to minimize the wastage of excess renewable energy generation.

Figure 1:
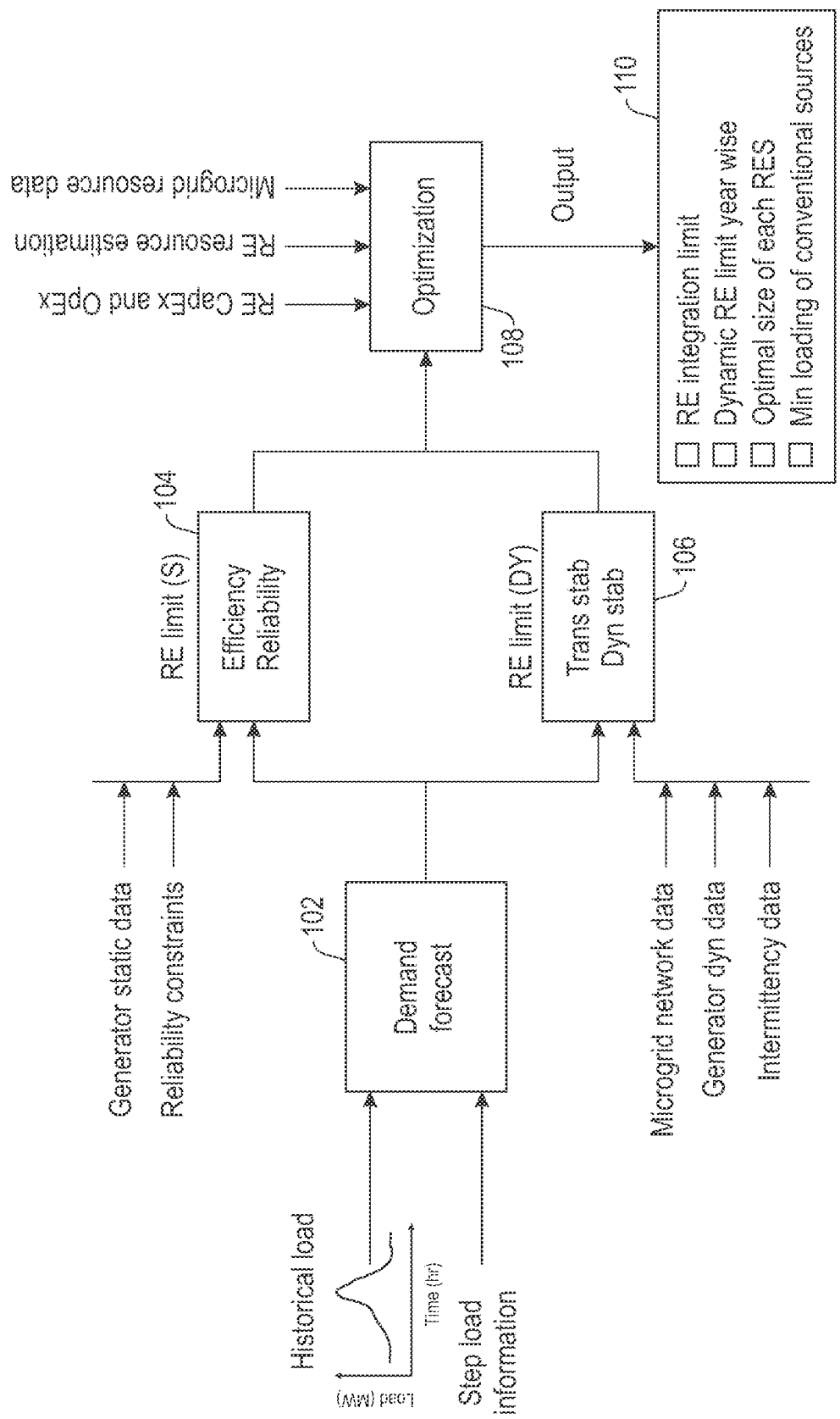
FIG. 1 is a diagram illustrating system architecture, according to an example embodiment of the invention.

FIG. 1 is a diagram illustrating system architecture, according to an embodiment of the invention. By way of illustration, FIG. 1 depicts a demand forecast module 102, an efficiency and reliability determination module 104, a transient stability and dynamic stability constraint module 106, an optimization module 108 and output 110. Specifically, historical load information and step load information are input to the demand forecast module 102, which provides output to the efficiency and reliability determination module 104 and the transient stability and dynamic stability constraint module 106. The demand forecast module 102 analyzes historical load (energy consumption) and predicts the future energy consumption pattern. Accordingly, the demand forecast module 102 analyzes various contexts such as type of the day (week day or week end), month, time (hour of the day), temperature, etc., and predicts future load based on similarities.

In addition to the output from the demand forecast module 102, generator static data (such as voltage and current rating, power ramp-up and ramp-down capability, resistance of the coil, etc.) and one or more reliability constraints are provided to the efficiency and reliability determination module 104, which provides output to the optimization module 108. Specifically, the efficiency and reliability determination module 104 determines a renewable integration limit based on static characteristics of conventional and non-conventional generators (such as power ramping-up or ramping-down capability, power output, fuel consumption efficiency, etc.). Further, this module (104) determines the RE penetration limit purely from an economic point of view (that is, a trade-off between high capital expenditures (CapEx) and low operating expenses (OpEx) of renewable sources versus low CapEx and high OpEx of conventional sources). Also, the efficiency and reliability determination module 104 ensures the reliability of the grid (that is, no overload on transmission lines, significant generation capacity reserve in case of any contingency like outage of a generator, etc.). Also, in addition to the output from the demand forecast module 102, micro-grid network data (such as connectivity information (that is, which component is connected to which other components) among various components (load, generator, transformer, etc.) of a micro-grid), generator dynamic (dyn) data (such as transient and sub-transient reactance of a generator, a saturation factor, an inertia constant, parameters for voltage and frequency controllers, etc.), and intermittency data (variation of solar power output due to cloud movements, for example) are provided to the transient stability and dynamic stability constraint module 106, which provides output to the optimization module 108. Additionally, the transient stability and dynamic stability constraint module 106 determines an RE integration limit considering the dynamic behavior of grid and RE sources. For example, a minimum of a steady state RE limit and a dynamic RE limit can be selected as the RE penetration upper limit/boundary, and the optimization module 108 would determine the best (or most optimal) solution within this boundary.

In addition to the output from the efficiency and reliability determination module 104 and the transient stability and dynamic stability constraint module 106, renewable energy CapEx and OpEx information, renewable energy resource estimations, and micro-grid resource data are provided to the optimization module 108, which generates output 110. Output 110 can include a determined renewable energy integration limit, a dynamic renewable energy limit for a given temporal period (year-wise, for example), an optimal size of each renewable energy resource, and a determined minimum loading of conventional energy sources.

Additionally, the optimization module 108 can also carry out the action of minimizing the following equation:

$$COE = \frac{ICC(S) * FCR}{AEP(S)} + AOE(S),$$

wherein:
COE=the levelized cost of energy (measured in dollars per kilowatt-hour, for example);
FCR=the fixed charge rate (measured in percent per year, for example) (annual interest rate on initial capital investment, for example);

$$AOE(S) = \sum_{i \in S} AOE(i) = \sum_{i \in S} \left( \frac{O\&M(i) + LRC(i)}{AEP(S)} \right) + LLC(S);$$

wherein:
O&M=the levelized operations and maintenance cost (measured in dollars, for example);
LRC=the levelized replacement and/or overhaul cost (measured in dollars, for example);

LLC=the land lease cost (measured in dollars, for example);

AEP=the expected annual energy production (measured in kilowatt-hours, for example; the AEP can be calculated as a product of average power production multiplied by time of operation);

ICC=the initial capital cost for renewable energy sources and storage (measured in dollars, for example);

AOE=the annual operational expenses (measured in dollars per year, for example); and further wherein the argument S and i indicate the cumulative and the individual turbine, respectively. By way merely of illustration, consider an example of a wind farm which includes multiple wind turbines. In this example, argument "S" indicates farm level quantity (for example, cumulative power output), and argument "i" represents turbine level quantity (for example, power output of individual turbine).

With respect to the above-noted variables, expected AEP can be calculated, for example, based on the availability of wind/solar resources at a particular site based on historical meteorological data. Additionally, capital investment cost, O&M cost, and interest values can be represented with fixed and/or standard values.

Additionally, in connection with one or more embodiments of the invention, the optimal size of a solar energy resource can be limited by penetration constraints that include generator loading capability and spinning reserve requirements. Generator (such as a diesel generator, for example) loading capability constraints can include minimum loading constraints and ramp limit constraints. A minimum loading constraint encompasses the observation that the efficiency of a generator is commonly poor at a lower load. For example, fuel consumption during idling can be approximately 20% of the full load condition. With respect to ramp limits, generators commonly need to fill the gap between load and generation during ramping in loads and/or renewable energy sources. Typically, by way of example, ramp-up limits for diesel generators are high, indicating that such generators can provide 100% rated capacity in a short amount of time (a matter of minutes, for instance). Accordingly, to maintain reliable operation of power grid, at any point of time, total generation is to be equal to load demand. As load demand is unpredictable, it can suddenly increase (referred to herein as a ramp-up) or decrease (referred to herein as a ramp-down). Conventional generators should maintain sufficient generation capacity to ramp-up and ramp-down instantaneously to follow the load pattern. In the case of renewable integration, along with load, output of renewable generators also changes randomly as such elements are often weather dependent. Therefore, RE integration is dependent on ramp-up or ramp-down capability of conventional generators.

Spinning reserve requirements can include, by way merely of example, a consideration of Max(A,B,C), wherein criteria A denotes that 10% of the load is required to compensate the variation in load, wherein criteria B refers to an outage of the largest unit (that is, one generator should be available to handle any contingency and/or periodic maintenance activities), and wherein criteria C refers to solar slack (that is, consideration of the observation that solar generation is highly intermittent). For example, photovoltaic (PV) power can change by 70% in a time frame of ten minutes. The values for the criteria variables can be, for example, set by the user.

Also, at least one embodiment of the invention includes incorporating dynamic and transient constraints. With respect to power system stability, transient stability constraints can involve the functioning of the power system following a large disturbance (such as a sudden disconnection of PV, for example). The time scale for such transient stability constraints can be relatively short (a few seconds, for instance). Additionally, dynamic stability constraints can involve assessing the ability of a power system to maintain stability under continuous and/or regular small disturbances (such as, for example, changes in load, changes in solar PV output, etc.). The time scale for such dynamic stability constraints can be longer than the above-noted transient constraints (for example, multiples seconds to one or more minutes).

Further, in one or more embodiments of the invention, stability can be determined by a frequency control and/or a voltage control. During disturbances, a frequency control can automatically deliver reserve active power to maintain the balance between demand and supply. Additionally, during disturbances, a voltage control can automatically deliver reserve reactive power to maintain the voltage stability of the grid.

Figure 2:
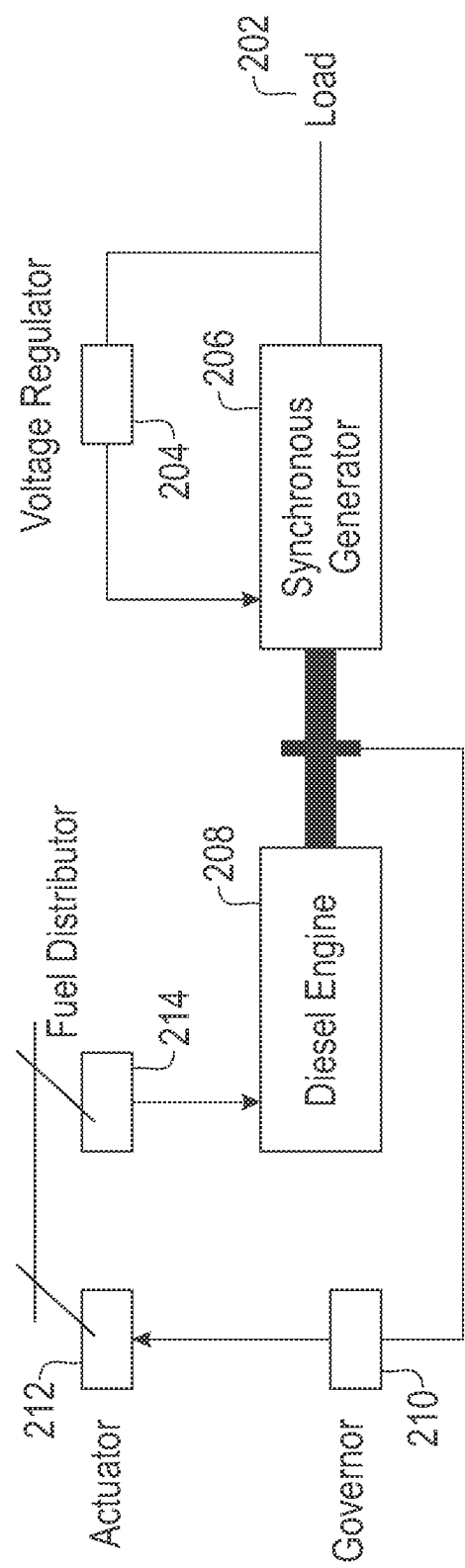
FIG. 2 is a diagram illustrating a control system of diesel generators, according to an example embodiment of the invention.

FIG. 2 is a diagram illustrating a control system of diesel generators, according to an example embodiment of the invention. By way of illustration, FIG. 2 depicts a system on which one or more embodiments of the invention can be carried out. The system, as illustrated in FIG. 2, includes a load 202, a voltage regulator 204, a synchronous generator 206, a diesel engine 208, a governor 210, an actuator 212 and a fuel distributor 214.

Engine 208 can represent, for example, an internal combustion (IC) engine which rotates the synchronous generator 206 to produce electricity. The synchronous generator 206 can attempt to match the power output with the load 202. When the load 202 increases, rotational speed (frequency) of the diesel generator decreases and governor 210 senses the drop in speed and instructs the actuator 212 to increase the fuel injection rate. Accordingly, fuel distributor 214 increases the fuel flow rate, which effectively increases the speed and hence output power of the generator 206. Similarly, in the case of the load voltage dropping, voltage regulator 204 regulates reactive power and adjusts the voltage output of the synchronous generator 206.

Additionally, in the case of a sudden disconnection of renewable sources (wind/solar), the total load can be redirected to one or more conventional sources. In such cases, at least one embodiment of the invention includes estimating the ramping-up or ramping-down capability of conventional generators (for example, a diesel generator) incorporating the sudden change in load. This facilitates a determination of the RE penetration limit.

Figure 3:
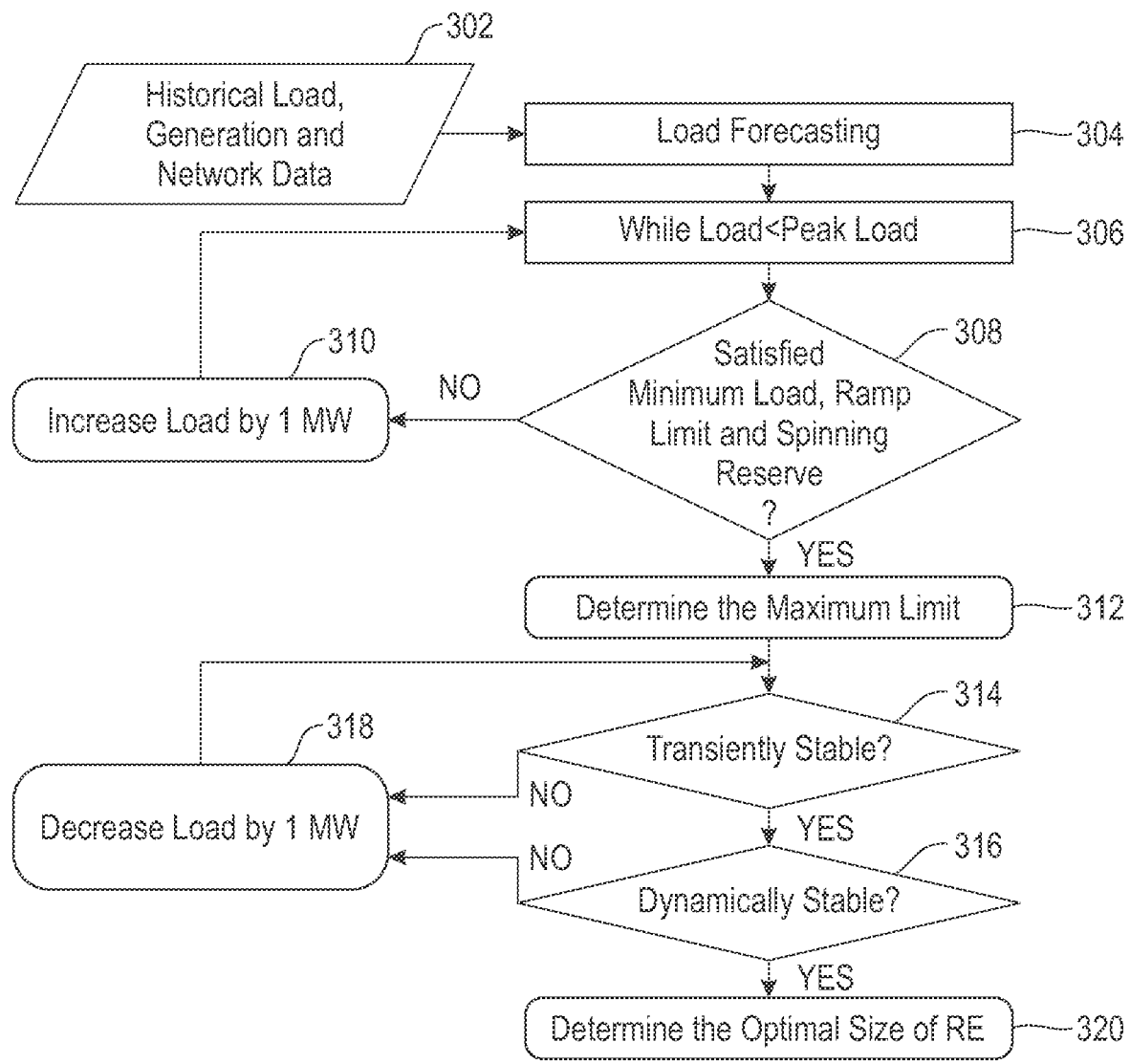
FIG. 3 is a diagram illustrating a computational flow, according to an example embodiment of the invention.

FIG. 3 is a diagram illustrating a computational flow, according to an example embodiment of the invention. Step 302 includes computing and/or obtaining historical load information, and generation and network data (which can be provided by a user, for example). The information computed and/or obtained in step 302 is used in step 304 to perform load forecasting by analyzing historical load data to determine changes in one or more load patterns. Step 306 includes determining whether the load is less than the peak load. By way merely of example, assume that a load forecasting module determines that the maximum load for any given power network by the year 2020 is X, and further assume that the year 2015 load is Y. Accordingly, on average, in every year between 2015 and 2020, the load will increase by (X-Y)/5. As such, an objective includes determining the RE penetration level for each year. Starting from current load Y, the load is increased up to peak load X, and RE limits are determined. In step 306 noted above, the load is increased until it reaches X (in the above example).

Step 308 includes determining whether a minimum load constraint, a ramp limit constraint, and a spinning reserve constraint have each been satisfied by integration of RE sources. If no (that is, the minimum load constraint, the ramp limit constraint, and the spinning reserve constraint have not been satisfied), the computational flow proceeds to step 310, which includes increasing the load (by one megawatt, for example), and subsequently returns to step 306. If yes (that is, the minimum load constraint, the ramp limit constraint, and the spinning reserve constraint have each been satisfied), the computational flow continues to step 312, which includes determining the maximum limit for RE penetration.

Additionally, step 314 includes determining whether the power system is transiently stable. If no (that is, the power system is not transiently stable), the computational flow proceeds to step 318, which includes decreasing the load (for example, by one megawatt), and subsequently returns to step 314. If yes, (that is, the power system is transiently stable), the computational flow continues to step 316, which includes determining whether the power system is dynamically stable. If no (that is, the power system is not dynamically stable), the load is decreased (for example, by one megawatt) via step 318, and the computational flow subsequently returns to step 314. If yes, (that is, the power system is dynamically stable), the computational flow continues to step 320, which includes determining the optimal size of one or more renewable energy resources.

Figure 4:
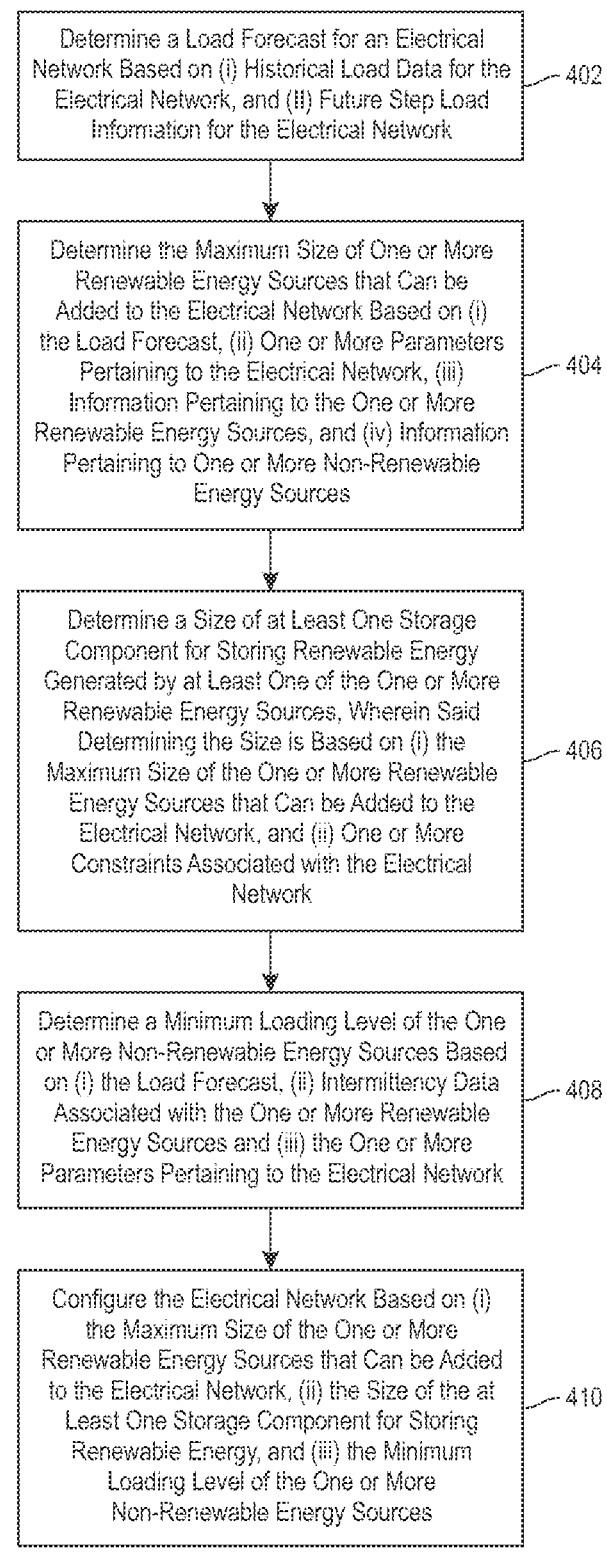
FIG. 4 is a flow diagram illustrating techniques according to an embodiment of the invention.

FIG. 4 is a flow diagram illustrating techniques according to an embodiment of the present invention. Step 402 includes determining a load forecast for an electrical network based on (i) historical load data for the electrical network, and (ii) future step load information for the electrical network.

Step 404 includes determining the maximum size of one or more renewable energy sources that can be added to the electrical network based on (i) the load forecast, (ii) one or more parameters pertaining to the electrical network, (iii) information pertaining to the one or more renewable energy sources, and (iv) information pertaining to one or more non-renewable energy sources. The one or more parameters can include one or more items of equipment data associated with the electrical network, such as one or more items of generator data and/or one or more items of protection system data.

Step 406 includes determining a size of at least one storage component for storing renewable energy generated by at least one of the one or more renewable energy sources, wherein said determining the size is based on (i) the maximum size of the one or more renewable energy sources that can be added to the electrical network, and (ii) one or more constraints associated with the electrical network. The one or more constraints can include one or more cost constraints associated with the electrical network such as a fixed charge rate, an operations cost, a maintenance cost, a land lease cost, and/or an initial capital cost. The constraints can also include one or more constraints pertaining to generator loading capability, such as a minimum loading constraint and/or a ramp limit constraint. Additionally, the constraints can include one or more spinning reserve requirements.

Step 408 includes determining a minimum loading level of the one or more non-renewable energy sources based on (i) the load forecast, (ii) intermittency data associated with the one or more renewable energy sources and (iii) the one or more parameters pertaining to the electrical network. Determining the minimum loading level of the one or more non-renewable energy sources can include determining an instantaneous minimum loading level of the one or more non-renewable energy sources. Additionally, determining the minimum loading level of the one or more non-renewable energy sources can include determining an average minimum loading level of the one or more non-renewable energy sources.

Step 410 includes configuring the electrical network based on (i) the maximum size of the one or more renewable energy sources that can be added to the electrical network, (ii) the size of the at least one storage component for storing renewable energy, and (iii) the minimum loading level of the one or more non-renewable energy sources. In at least one embodiment of the invention, the techniques depicted in FIG. 4 can be carried out by at least one computing device.

Also, an additional embodiment of the invention includes determining a load forecast for an electrical network based on (i) historical load data for the electrical network, and (ii) future step load information for the electrical network; determining an initial size of one or more renewable energy sources that can be added to the electrical network based on (i) the load forecast, (ii) one or more parameters pertaining to the electrical network, (iii) information pertaining to the one or more renewable energy sources, and (iv) information pertaining to one or more non-renewable energy sources. Such an embodiment also includes determining an amount of future increase to the size of the one or more renewable energy sources that can be added to the electrical network per a given temporal frequency based on (i) the load forecast and (ii) the initial size of the one or more renewable energy sources that can be added to the electrical network; and determining a size of at least one storage component for storing renewable energy generated by at least one of the one or more renewable energy sources, wherein to determining the size is based on (i) the initial size of the one or more renewable energy sources that can be added to the electrical network, (ii) the amount of future increase to the size of the one or more renewable energy sources that can be added to the electrical network, and (iii) one or more constraints associated with the electrical network. Additionally, such an embodiment also includes determining a minimum loading level of the one or more non-renewable energy sources based on (i) the load forecast, (ii) intermittency data associated with the one or more renewable energy sources and (iii) the one or more parameters pertaining to the electrical network; and configuring the electrical network based on (i) the initial size of the one or more renewable energy sources that can be added to the electrical network, (ii) the amount of future increase to the size of the one or more renewable energy sources that can be added to the electrical network, (iii) the size of the at least one storage component for storing renewable energy, and (iv) the minimum loading level of the one or more non-renewable energy sources.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
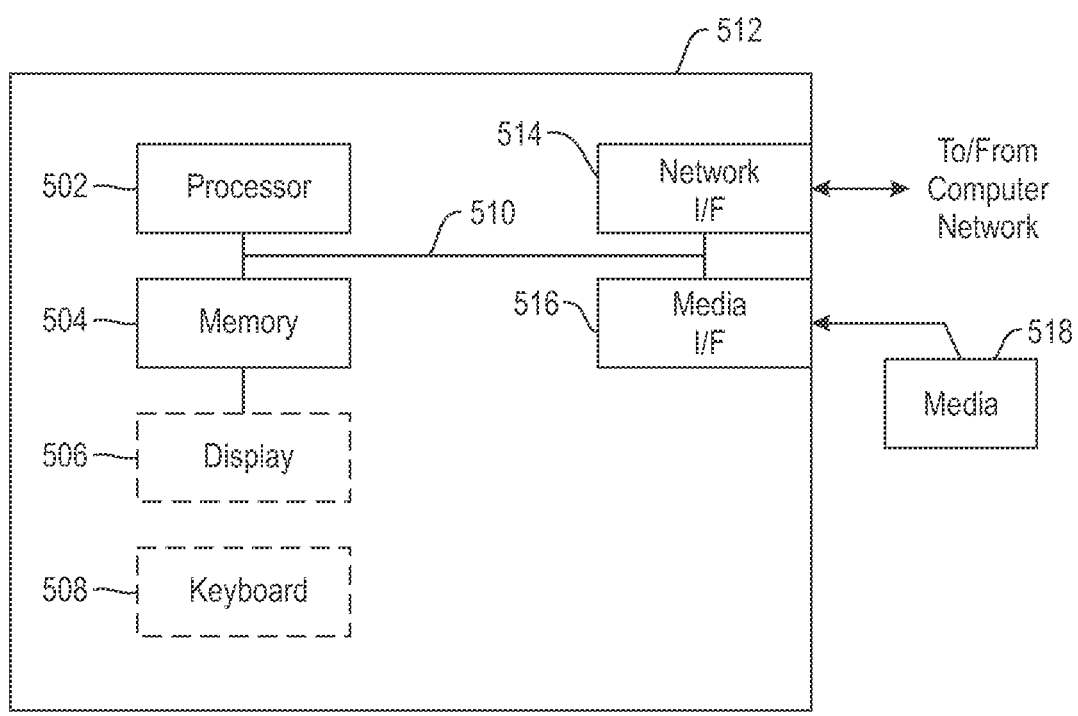
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, determining the minimum loading level (instantaneous and average) of sources in the presence of intermittent renewable energy sources to maintain stability of the grid given a load profile, one or more network parameters and one or more generation source characteristics.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining a load forecast for an electrical network based on (i) historical load data for the electrical network, and (ii) future step load information for the electrical network;
   determining the maximum size of one or more renewable energy sources that can be added to the electrical network based on (i) the load forecast, (ii) one or more parameters pertaining to the electrical network comprising resistance, reactance, and capacitance, (iii) information pertaining to the one or more renewable energy sources, and (iv) information pertaining to one or more non-renewable energy sources comprising multiple generator parameters comprising transient reactance and one or more droop characteristics;
   determining a size of at least one storage component for storing renewable energy generated by at least one of the one or more renewable energy sources, wherein said determining the size is based on (i) the maximum size of the one or more renewable energy sources that can be added to the electrical network, and (ii) one or more constraints associated with the electrical network;
   determining a minimum loading level of the one or more non-renewable energy sources based on (i) the load forecast, (ii) intermittency data associated with the one or more renewable energy sources and (iii) the one or more parameters pertaining to the electrical network, wherein said determining the minimum loading level of the one or more non-renewable energy sources comprises determining an average minimum loading level of the one or more non-renewable energy sources;
   configuring the electrical network based on (i) the maximum size of the one or more renewable energy sources that can be added to the electrical network, (ii) the size of the at least one storage component for storing renewable energy, and (iii) the minimum loading level of the one or more non-renewable energy sources, wherein said configuring comprises minimizing a levelized cost of energy associated with the electrical network calculated based on an initial capital cost for the one or more renewable energy sources and the at least one storage component, a fixed charge rate, an expected annual energy production associated with the electrical network, operational expenses for a given period of time, and an argument indicating an electric network-level quantity; and
   implementing a control system of one or more diesel generators in conjunction with the electrical network and configuring the control system of one or more diesel generators to automatically deliver reserve active power to maintain an approximate balance a balance between demand and supply in the electrical network based at least in part on said configuring of the electrical network;
   wherein said steps are carried out by at least one computing device.

2. The computer-implemented method of claim 1, wherein the one or more parameters pertaining to the electrical network comprise one or more items of equipment data associated with the electrical network.

3. The computer-implemented method of claim 2, wherein the one or more items of equipment data comprise one or more items of generator data.

4. The computer-implemented method of claim 2, wherein the one or more items of equipment data comprise one or more items of protection system data.

5. The computer-implemented method of claim 1, wherein the one or more constraints associated with the electrical network comprise one or more cost constraints associated with the electrical network.

6. The computer-implemented method of claim 5, wherein the one or more cost constraints comprise a fixed charge rate.

7. The computer-implemented method of claim 5, wherein the one or more cost constraints comprise an operations cost.

8. The computer-implemented method of claim 5, wherein the one or more cost constraints comprise a maintenance cost.

9. The computer-implemented method of claim 5, wherein the one or more cost constraints comprise a land lease cost.

10. The computer-implemented method of claim 5, wherein the one or more cost constraints comprise an initial capital cost.

11. The computer-implemented method of claim 1, wherein the one or more constraints associated with the electrical network comprise one or more constraints pertaining to generator loading capability.

12. The computer-implemented method of claim 11, wherein the one or more constraints pertaining to generator loading capability comprise a minimum loading constraint.

13. The computer-implemented method of claim 11, wherein the one or more constraints pertaining to generator loading capability comprise a ramp limit constraint.

14. The computer-implemented method of claim 1, wherein the one or more constraints associated with the electrical network comprise one or more spinning reserve requirements.

15. The computer-implemented method of claim 1, wherein said determining the minimum loading level of the one or more non-renewable energy sources comprises determining an instantaneous minimum loading level of the one or more non-renewable energy sources.

16. A computer program product, the computer program product comprising a computer readable storage medium having program instructions embodied therewith, the program instructions executable by a device to cause the device to:
   determine a load forecast for an electrical network based on (i) historical load data for the electrical network, and (ii) future step load information for the electrical network;
   determine the maximum size of one or more renewable energy sources that can be added to the electrical network based on (i) the load forecast, (ii) one or more parameters pertaining to the electrical network comprising resistance, reactance, and capacitance, (iii) information pertaining to the one or more renewable energy sources, and (iv) information pertaining to one or more non-renewable energy sources comprising multiple generator parameters comprising transient reactance and one or more droop characteristics;
   determine a size of at least one storage component for storing renewable energy generated by at least one of the one or more renewable energy sources, wherein said determining the size is based on (i) the maximum size of the one or more renewable energy sources that can be added to the electrical network, and (ii) one or more constraints associated with the electrical network;
   determine a minimum loading level of the one or more non-renewable energy sources based on (i) the load forecast, (ii) intermittency data associated with the one or more renewable energy sources and (iii) the one or more parameters pertaining to the electrical network, wherein said determining the minimum loading level of the one or more non-renewable energy sources comprises determining an average minimum loading level of the one or more non-renewable energy sources;

configure the electrical network based on (i) the maximum size of the one or more renewable energy sources that can be added to the electrical network, (ii) the size of the at least one storage component for storing renewable energy, and (iii) the minimum loading level of the one or more non-renewable energy sources, wherein said configuring comprises minimizing a levelized cost of energy associated with the electrical network calculated based on an initial capital cost for the one or more renewable energy sources and the at least one storage component, a fixed charge rate, an expected annual energy production associated with the electrical network, operational expenses for a given period of time, and an argument indicating an electric network-level quantity; and implement a control system of one or more diesel generators in conjunction with the electrical network and configure the control system of one or more diesel generators to automatically deliver reserve active power to maintain a balance between demand and supply in the electrical network based at least in part on said configuring of the electrical network.

17. A system comprising:

a memory; and at least one processor coupled to the memory and configured for:

determining a load forecast for an electrical network based on (i) historical load data for the electrical network, and (ii) future step load information for the electrical network;

determining the maximum size of one or more renewable energy sources that can be added to the electrical network based on (i) the load forecast, (ii) one or more parameters pertaining to the electrical network comprising resistance, reactance, and capacitance, (iii) information pertaining to the one or more renewable energy sources, and (iv) information pertaining to one or more non-renewable energy sources comprising multiple generator parameters comprising transient reactance and one or more droop characteristics;

determining a size of at least one storage component for storing renewable energy generated by at least one of the one or more renewable energy sources, wherein said determining the size is based on (i) the maximum size of the one or more renewable energy sources that can be added to the electrical network, and (ii) one or more constraints associated with the electrical network; determining a minimum loading level of the one or more non-renewable energy sources based on (i) the load forecast, (ii) intermittency data associated with the one or more renewable energy sources and (iii) the one or more parameters pertaining to the electrical network, wherein said determining the minimum loading level of the one or more non-renewable energy sources comprises determining an average minimum loading level of the one or more non-renewable energy sources;

configuring the electrical network based on (i) the maximum size of the one or more renewable energy sources that can be added to the electrical network, (ii) the size of the at least one storage component for storing renewable energy, and (iii) the minimum loading level of the one or more non-renewable energy sources, wherein said configuring comprises minimizing a levelized cost of energy associated with the electrical network calculated based on an initial capital cost for the one or more renewable energy sources and the at least one storage component, a fixed charge rate, an expected annual energy production associated with the electrical network, operational expenses for a given period of time, and an argument indicating an electric network-level quantity; and implementing a control system of one or more diesel generators in conjunction with the electrical network and configuring the control system of one or more diesel generators to automatically deliver reserve active power to maintain a balance between demand and supply in the electrical network based at least in part on said configuring of the electrical network.

* * * * *